(12) United States Patent
Uchino et al.

(10) Patent No.: US 9,942,806 B2
(45) Date of Patent: Apr. 10, 2018

(54) MOBILE COMMUNICATION METHOD AND RADIO BASE STATION

(71) Applicant: NTT DOCOMO, INC., Tokyo (JP)

(72) Inventors: Tooru Uchino, Tokyo (JP); Hideaki Takahashi, Tokyo (JP); Wuri Andarmawanti Hapsari, Tokyo (JP); Hiroto Tooyama, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 132 days.

(21) Appl. No.: 14/914,850

(22) PCT Filed: Aug. 28, 2014

(86) PCT No.: PCT/JP2014/072559
§ 371 (c)(1),
(2) Date: Feb. 26, 2016

(87) PCT Pub. No.: WO2015/030109
PCT Pub. Date: Mar. 5, 2015

(65) Prior Publication Data
US 2016/0219466 A1    Jul. 28, 2016

(30) Foreign Application Priority Data

Aug. 30, 2013  (JP) ................................. 2013-180498

(51) Int. Cl.
*H04B 1/38*     (2015.01)
*H04W 36/00*    (2009.01)
(Continued)

(52) U.S. Cl.
CPC ....... *H04W 36/0055* (2013.01); *H04L 5/0055* (2013.01); *H04W 36/02* (2013.01); *H04W 36/08* (2013.01); *H04W 88/16* (2013.01)

(58) Field of Classification Search
CPC . H04W 36/0055; H04W 36/02; H04W 88/16; H04W 36/08; H04L 5/0055
(Continued)

(56) References Cited

U.S. PATENT DOCUMENTS 9,554,309 B2 * 1/2017  Park ................. H04W 36/0055
2011/0149905 A1  6/2011  Kim
(Continued)

FOREIGN PATENT DOCUMENTS

JP    2007-336225 A    12/2007
WO   2014/013892 A1    1/2014

OTHER PUBLICATIONS

International Search Report issued in PCT/JP2014/072559 dated Dec. 2, 2014 (1 page).
(Continued)

*Primary Examiner* — Amancio Gonzalez
(74) *Attorney, Agent, or Firm* — Osha Liang LLP (57) ABSTRACT

In Inter-eNB handover with "full configuration", UL-PDCP-PDUs are handled appropriately. A mobile communication method according to the present invention includes, in Inter-eNB handover of a mobile station UE from a radio base station eNB#1 to a radio base station eNB#2, the step of causing the radio base station eNB#1 to discard all the UL-PDCP-PDUs having been successfully received, if the radio base station eNB#2 instructs the mobile station UE to once delete all the configuration set between the mobile station UE and the radio base station eNB#1.

9 Claims, 4 Drawing Sheets (51) Int. Cl.
*H04L 5/00* (2006.01)
*H04W 36/02* (2009.01)
*H04W 36/08* (2009.01)
*H04W 88/16* (2009.01)

(58) Field of Classification Search
USPC ........................................................ 455/438
See application file for complete search history.

(56) References Cited

U.S. PATENT DOCUMENTS

2012/0088457 A1* 4/2012 Johansson ............. H04W 24/10
455/67.11
2015/0195748 A1 7/2015 Uchino et al.

OTHER PUBLICATIONS

Written Opinion of the International Searching Authority issued in PCT/JP2014/072559 dated Dec. 2, 2014 (3 pages).
CATT; "Lossless handover involving Short-to-Long PDCP SN reconfiguration"; 3GPP TSG-RAN WG2 Meeting #79bis, R2-124524; Bratislava, Slovakia; Oct. 8-12, 2012 (3 pages).
3GPP TS 36.300 V10.10.0; "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 10)"; Jun. 2013 (194 pages).
3GPP TS 36.331 V11.4.0; "3rd Generation Partnership Project; Technical Specification Group Radio Access Network; Evolved Universal Terrestrial Radio Access (E-UTRA); Radio Resource Control (RRC); Protocol specification (Release 11)"; Jun. 2013 (346 pages).
Extended European Search Report issued in corresponding European Application No. 14840213.4, dated Apr. 5, 2017 (13 pages).
Nokia Siemens Networks; "Delta signalling across eNBs of different RRC protocol release"; 3GPP TSG-RAN WG2 Meeting #68bis, R2-100294; Valencia, Spain; Jan. 18-22, 2010 (5 pages).
3GPP TS 36.300 version 11.6.0 Release 11 (ETSI TS 136 300); "LTE; Evolved Universal Terrestrial Radio Access (E-UTRA) and Evolved Universal Terrestrial Radio Access network (E-UTRAN); Overall description; Stage 2"; Jul. 2013 (223 pages).

* cited by examiner

MOBILE COMMUNICATION METHOD AND RADIO BASE STATION

TECHNICAL FIELD

The present invention relates to a mobile communication method and a radio base station.

BACKGROUND ART

In LTE (Long Term Evolution), radio base stations eNB may support different releases or functions. Thus, handover between radio base stations eNB requires control to avoid inconsistency in "configuration (setting)" between the radio base station eNB and a mobile station UE.

As an information element of "configuration" in "Handover Command" set by a handover target radio base station T-eNB, "delta configuration", i.e., a difference from the current "configuration" is basically notified. This may result in a situation where the handover target radio base station T-eNB supporting an old release controls the mobile station UE without deleting the "configuration" of a handover source radio base station S-eNB supporting a later release. This situation is not desirable from the viewpoint of call control.

In order to avoid inconsistency in "configuration" between a mobile station UE and a handover source radio base station S-eNB, "full configuration" has been provided as a mechanism of once deleting all the "configuration" of the handover source radio base station S-eNB (see Non-Patent Documents 1 and 2).

When the mobile station UE receives "Handover Command" containing an information element of "full configuration", the mobile station UE once deletes all the "configuration" (including releasing the bearer).

In addition, in the Inter-eNB handover, the handover source radio base station S-eNB forwards pending downlink data and uplink data to a handover target radio base station T-eNB. Thus, even when the mobile station UE moves, the communications can be continued.

Here, the Inter-eNB handover is specified such that an RLC-AM (Radio Link Control-Acknowledged Mode) function of the handover source radio base station S-eNB should perform the following operation in normal data forwarding (see Non-Patent Document 1).

In the downlink, the RLC-AM function of the handover source radio base station S-eNB is configured to forward or discard a UL-PDCP-SDU (Uplink-Packet Data Convergence-Service Data Unit) for which ACK has not been received in the RLC layer.

On the other hand, in the uplink, the RLC-AM function of the handover source radio base station S-eNB is configured to forward a UL-PDCP-PDU having been received in order of sequence numbers to a gateway node S-GW, and to forward, to the handover target radio base station T-eNB, or discard a UL-PDCP-PDU having been received out of order of the sequence numbers.

PRIOR ART DOCUMENT

Non-Patent Document

NON-PATENT DOCUMENT 1: 3GPP TS36.300
NON-PATENT DOCUMENT 2: 3GPP TS36.331

SUMMARY OF THE INVENTION

The current LTE, however, has a problem in that it is still unclear how the RLC-AM function of the handover source radio base station S-eNB should handle UL-PDCP-PDUs in Inter-eNB handover with "full configuration".

Hence, the present invention has been made in view of the foregoing problem, and has an objective to provide a mobile communication method and a radio base station capable of appropriately handling UL-PDCP-PDUs in Inter-eNB handover with "full configuration".

A first feature of the present invention is summarized as a mobile communication method of executing a handover of a mobile station from a cell under a first radio base station to a cell under a second radio base station, the method including the steps of, in the handover, causing the first radio base station to discard all the UL-PDCP-PDUs having been successfully received, if the second radio base station instructs the mobile station to once delete all the configuration set between the mobile station and the first radio base station.

A second feature of the present invention is summarized as a mobile communication method of executing a handover of a mobile station from a cell under a first radio base station to a cell under a second radio base station, the method including the steps of, in the handover, causing the first radio base station to deliver all UL-PDCP-PDUs having been successfully received to a gateway node, if the second radio base station instructs the mobile station to once delete all the configuration set between the mobile station and the first radio base station.

A third feature of the present invention is summarized as a mobile communication method of executing a handover of a mobile station from a cell under a first radio base station to a cell under a second radio base station, the method including the steps of, in the handover, if the second radio base station instructs the mobile station to once delete all the configuration set between the mobile station and the first radio base station, causing the first radio base station to forward all UL-PDCP-PDUs having been successfully received to the second radio base station; and causing the second radio base station to send the received UL-PDCP-PDUs to a gateway node.

A fourth feature of the present invention is summarized as a mobile communication method of executing a handover of a mobile station from a cell under a first radio base station to a cell under a second radio base station, the method including the step of, in the handover, causing the first radio base station to discard all UL-PDCP-PDUs having been successfully received if an identifier for a path for uplink data forwarding is not notified in a handover request acknowledgement signal sent by the second radio base station.

A fifth feature of the present invention is summarized as a mobile communication method of executing a handover of a mobile station from a cell under a first radio base station to a cell under a second radio base station, the method including the step of, in the handover, causing the first radio base station to deliver all UL-PDCP-PDUs having been successfully received to a gateway node, if an identifier for a path for uplink data forwarding is not notified in a handover request acknowledgement signal sent by the second radio base station.

A sixth feature of the present invention is summarized as a mobile communication method of executing a handover of a mobile station from a cell under a first radio base station to a cell under a second radio base station, the method including the step of, in the handover, if the second radio base station does not admit to establish an RLC-AM bearer which is established between the first radio base station and the mobile station, causing the first radio base station to discard all UL-PDCP-PDUs having been successfully received via the RLC-AM bearer.

A seventh feature of the present invention is summarized as a mobile communication method of executing a handover of a mobile station from a cell under a first radio base station to a cell under a second radio base station, the method including the step of, in the handover, if the second radio base station does not admit to establish an RLC-AM bearer which is established between the first radio base station and the mobile station, causing the first radio base station to deliver all UL-PDCP-PDUs having been successfully received via the RLC-AM bearer to a gateway node.

An eighth feature of the present invention is summarized as a mobile communication method of executing a handover of a mobile station from a cell under a first radio base station to a cell under a second radio base station, the method including the steps of, in the handover, if the second radio base station does not admit to establish an RLC-AM bearer which is established between the first radio base station and the mobile station, causing the first radio base station to forward all UL-PDCP-PDUs having been successfully received via the RLC-AM bearer to the second radio base station; and causing the second radio base station to send the received UL-PDCP-PDUs to a gateway node.

A ninth feature of the present invention is summarized as a radio base station capable of operating as a first radio base station in a handover of a mobile station from a cell under the first radio base station to a cell under a second radio base station, the radio base station including a control unit configured to, in the handover, discard all UL-PDCP-PDUs having been successfully received, if the second radio base station instructs the mobile station to once delete all the configuration set between the radio base station and the mobile station.

A tenth feature of the present invention is summarized as a radio base station capable of operating as a first radio base station in a handover of a mobile station from a cell under the first radio base station to a cell under a second radio base station, the radio base station including a transmission unit configured to, in the handover, deliver all UL-PDCP-PDUs having been successfully received to the second radio base station or a gateway node, if the second radio base station instructs the mobile station to once delete all the configuration set between the radio base station and the mobile station.

An eleventh feature of the present invention is summarized as a radio base station capable of operating as a first radio base station in a handover of a mobile station from a cell under the first radio base station to a cell under a second radio base station, the radio base station including a control unit configured to, in the handover, discard all UL-PDCP-PDUs having been successfully received if an identifier for a path for uplink data forwarding is not notified in a handover request acknowledgement signal sent by the second radio base station.

A twelfth feature of the present invention is summarized as a radio base station capable of operating as a first radio base station in a handover of a mobile station from a cell under the first radio base station to a cell under a second radio base station, the radio base station including a transmission unit configured to, in the handover, deliver all UL-PDCP-PDUs having been successfully received to a gateway node, if an identifier for a path for uplink data forwarding is not notified in a handover request acknowledgement signal sent by the second radio base station.

A thirteen feather of the present invention is summarized as a radio base station capable of operating as a first radio base station in a handover of a mobile station from a cell under the first radio base station to a cell under a second radio base station, the radio base station including a control unit configured to, in the handover, if the second radio base station does not admit to establish an RLC-AM bearer which is established between the radio base station and the mobile station, discard all UL-PDCP-PDUs having been successfully received via the RLC-AM bearer.

A fourteenth feature of the present invention is summarized as a radio base station capable of operating as a first radio base station in a handover of a mobile station from a cell under the first radio base station to a cell under a second radio base station, the radio base station including a transmission unit configured to, in the handover, if the second radio base station does not admit to establish an RLC-AM bearer which is established between the radio base station and the mobile station, deliver all UL-PDCP-PDUs having been successfully received via the RLC-AM bearer to the second radio base station or a gateway node.

MODES FOR CARRYING OUT THE INVENTION

Mobile Communication System According to Embodiment of the Present Invention

Figure 1:
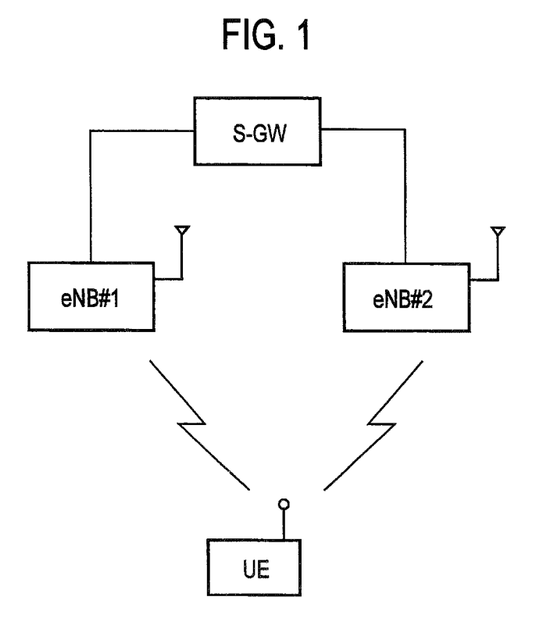
FIG. 1 is an overall configuration diagram of a mobile communication system according to an embodiment of the present invention.
Figure 2:
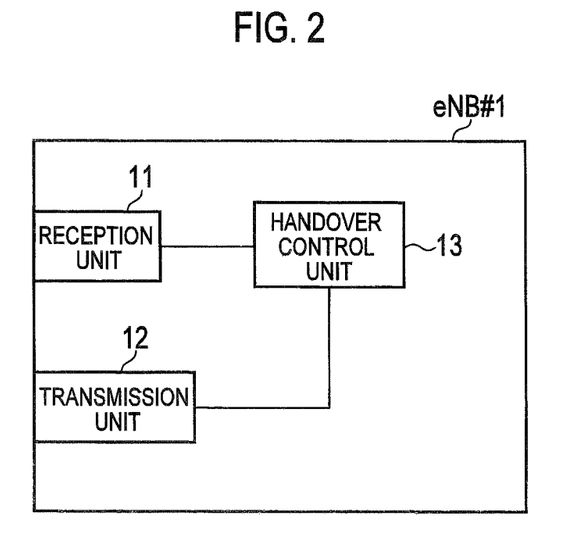
FIG. 2 is a functional block diagram of a radio base station eNB#1 according to the embodiment of the present invention.
Figure 3:
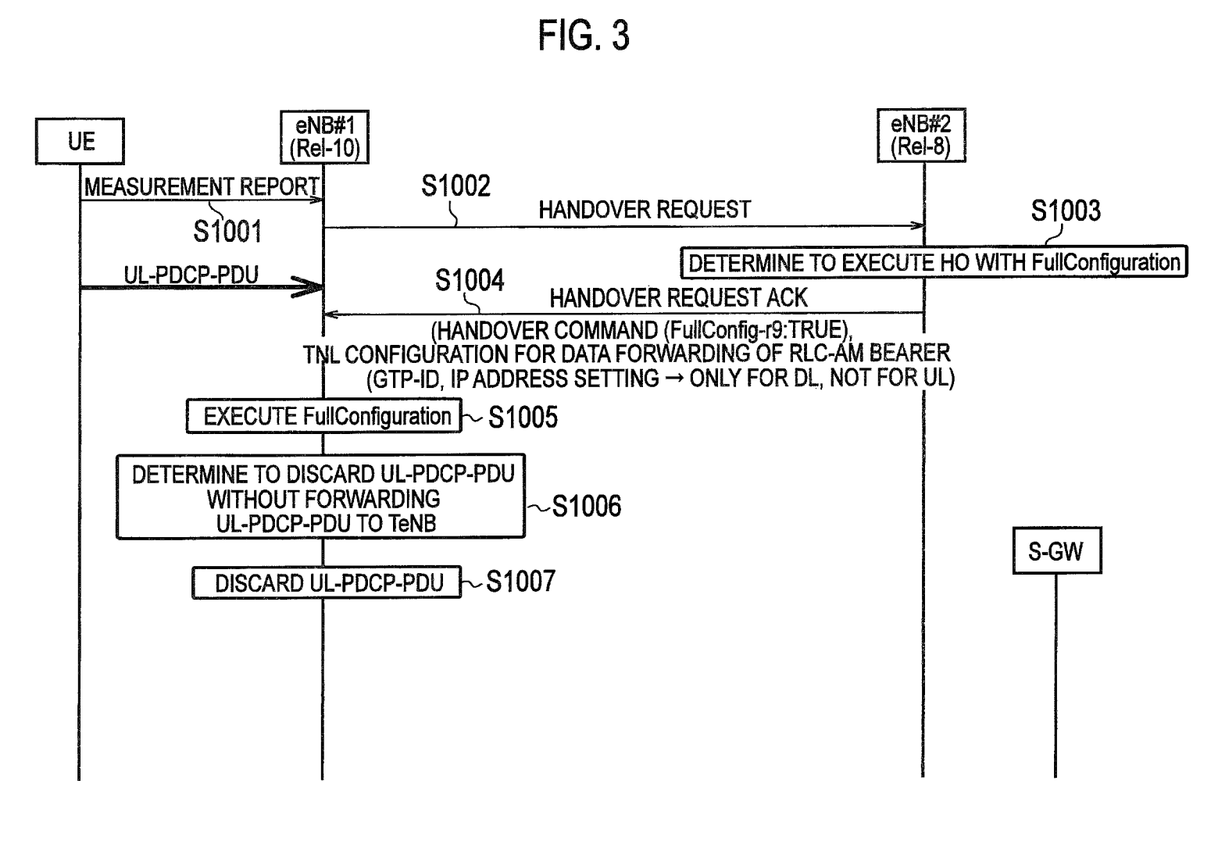
FIG. 3 is a sequence diagram presenting an example of an operation of the mobile communication system according to the embodiment of the present invention.

With reference to FIGS. 1 to 3, description is provided for a mobile communication system according to an embodiment of the present invention.

As illustrated in FIG. 1, the mobile communication system according to the present embodiment is an LTE mobile communication system, and includes a gateway node S-GW, a radio base station eNB#1, a radio base station eNB#2, and a mobile station UE.

In the present embodiment, description is provided for a case where the mobile station UE performs Inter-eNB handover from a cell under the radio base station eNB#1 to a cell under the radio base station eNB#2.

Here, the radio base station eNB#1 and the radio base station eNB#2 may support the same release or functions, or may support different Releases or functions. The mobile communication system according to the present embodiment described herein is based on the assumption that the radio base station eNB#1 supports Release-10 and the radio base station eNB#2 supports Release-S.

As illustrated in FIG. 2, the radio base station eNB#1 includes a reception unit 11, a transmission unit 12, and a handover control unit 13.

The reception unit 11 is configured to receive various kinds of signals from the mobile station UE, the radio base station eNB#2, the gateway node S-GW, and others, and the transmission unit 12 is configured to send various kinds of signals to the mobile station UE, the radio base station eNB#2, the gateway node S-GW, and others.

The handover control unit 13 is configured to perform control for the foregoing Inter-eNB handover.

Specifically, in the foregoing Inter-eNB handover, the handover control unit 13 may be configured to discard all the UL-PDCP-PDUs having been successfully received if the radio base station eNB#2 sends the mobile station UE an instruction to once delete all the configuration set between the radio base station eNB#1 and the mobile station UE, that is, "Handover Command" containing an information element of "full configuration".

Instead, in the foregoing Inter-eNB handover, the handover control unit 13 may be configured to discard all the UL-PDCP-PDUs having been successfully received if an identifier for a path for uplink data forwarding is not notified in "Handover Request Ack" sent by the radio base station eNB#2, in other words, if the GTP-ID and IP address in the uplink are not set in the TNL configuration for "Data Forwarding" of an RLC-AM bearer in "Handover Request Ack".

Alternatively, in the foregoing Inter-eNB handover, the handover control unit 13 may be configured to, if the radio base station eNB#2 cannot establish an RLC-AM bearer, which is established between the radio base station eNB#1 and the mobile station UE, for example, if the radio base station eNB#2 already establishes bearers up to an upper limit number of bearers allowed to be established in the radio base station eNB#2 (Partial handover), discard all the UL-PDCP-PDUs having been successfully received via the RLC-AM bearer.

Hereinafter, with reference to FIG. 3, description is provided for an operation of the mobile communication system according to the present embodiment.

As presented in FIG. 3, in step S1001, the mobile station UE sends "Measurement Report" to the radio base station eNB#1.

In response to "Measurement Report", the radio base station eNB#1 determines to execute Inter-eNB handover of the mobile station UE from the cell under the radio base station eNB#1 to the cell under the radio base station eNB#2, and sends "Handover Request" to the radio base station eNB#2 in step S1002.

The radio base station eNB#2 determines to execute the Inter-eNB handover with "full configuration" in response to the "Handover Request" in step S1003, and sends "Handover Request ACK" containing the information element of "full configuration" to the radio base station eNB#1 in step S1004.

Here, in "Handover Request ACK", the GTP-ID and the IP address in the uplink do not have to be set in the TNL configuration for "Data Forwarding" of the RLC-AM bearer.

The radio base station eNB#1 performs "full configuration" in step S1005, specifically, once deletes all the configuration set between the mobile station UE and the radio base station eNB#1, determines to discard all the UL-PDCP-PDUs (including Out-of-order UL-PDCP-PDUs) having been successfully received in step S1006, and discards the UL-PDCP-PDUs in step S1007.

In the mobile communication system according to the present embodiment, the radio base station eNB#1 discards all the UL-PDCP-PDUs having been successfully received, simply in response to detection of the information element of "full configuration". This enables the mobile communication system to deal with the Inter-eNB handover with "full configuration" with simple implementation.

Modified Example 1

Hereinafter, with reference to FIG. 4, a mobile communication system according to a modified example 1 of the present invention is described with focus placed on different points from those in the mobile communication system according to the foregoing embodiment.

In the mobile communication system according to the modified example 1, in Inter-eNB handover of a mobile station UE from a cell under a radio base station eNB#1 to a cell under a radio base station eNB#2, a transmission unit 12 may be configured to deliver all the UL-PDCP-PDUs having been successfully received to a gateway node S-GW, if the radio base station eNB#2 instructs the mobile station UE to once delete all the configuration set between the radio base station eNB#1 and the mobile station UE.

Alternatively, in the foregoing Inter-eNB handover, the transmission unit 12 may be configured to deliver all the UL-PDCP-PDUs having been successfully received to the gateway node S-GW, if the identifier of the path for uplink data forwarding is not notified in "Handover Request Ack", in other words, if the GTP-ID and IP address in the uplink are not set in the TNL configuration for "Data Forwarding" of the RLC-AM bearer in "Handover Request Ack".

Otherwise, in the foregoing Inter-eNB handover, the transmission unit 12 may be configured to deliver all the UL-PDCP-PDUs having been successfully received to the gateway node S-GW, if the radio base station eNB#2 cannot establish the RLC-AM bearer, which is established between the radio base station eNB#1 and the mobile station UE, for example, if the radio base station eNB#2 already establishes bearers up to an upper limit number of bearers allowed to be established in the radio base station eNB#2 (Partial handover).

Figure 4:
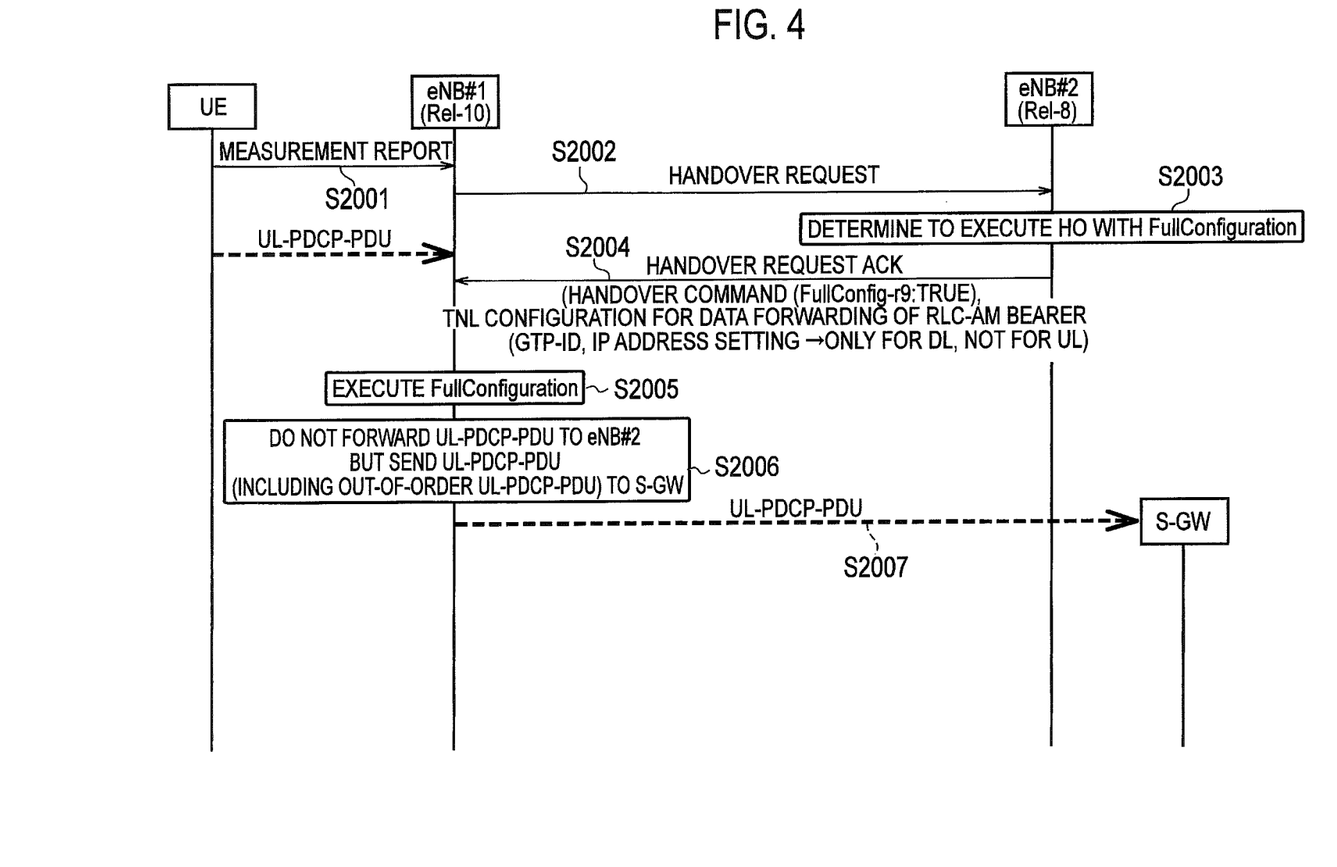
FIG. 4 is a sequence diagram presenting an example of an operation of a mobile communication system according to a modified example 1 of the present invention.

With reference to FIG. 4, description is provided below for an operation of the mobile communication system according to the modified example 1.

As presented in FIG. 4, the operation in steps S2001 to S2005 is the same as the operation in steps S1001 to S1005 presented in FIG. 3.

The radio base station eNB#1 determines to forward all the UL-PDCP-PDUs having been successfully received (including Out-of-order UL-PDCP-PDUs) not to the radio base station eNB#2 but to the gateway node S-GW (S1 interface) in step S2006, and forwards the UL-PDCP-PDUs to the gateway node S-GW (S1 interface) in step S2007.

In the mobile communication system according to the modified example 1, if the TCP layer function on a server side can receive UL-PDCP-PDUs which have been received out of order of the sequence numbers (that is, Out-of-order UL-PDCP-PDUs), and can send "Selective-ACK" in the downlink, the TCP layer function in the mobile station UE can detect that the aforementioned UL-PDCP-PDUs have been discarded, and can resend the UL-PDCP-PDUs. This makes it possible to avoid a TCP slow start due to RTO (Retransmission Time Out), in other words, to avoid a decrease in the throughput in the uplink in Inter-eNB handover with "full configuration".

Modified Example 2

Hereinafter, with reference to FIG. 5, a mobile communication system according to a modified example 2 of the present invention is described with focus placed on different points from those in the mobile communication system according to the foregoing embodiment.

In the mobile communication system according to the modified example 2, in Inter-eNB handover of a mobile station UE from a cell under a radio base station eNB#1 to a cell under a radio base station eNB#2, the transmission unit 12 may be configured to deliver all the UL-PDCP-PDUs having been successfully received to the radio base station eNB#2, if the radio base station eNB#2 instructs the mobile station UE to once delete all the configuration set between the radio base station eNB#1 and the mobile station UE.

Alternatively, in the foregoing Inter-eNB handover, the transmission unit 12 may be configured to deliver all the UL-PDCP-PDUs having been successfully received to the radio base station eNB#2, if the radio base station eNB#2 cannot establish the RLC-AM bearer, which is established between the radio base station eNB#1 and the mobile station UE, for example, if the radio base station eNB#2 already establishes bearers up to an upper limit number of bearers allowed to be established in the radio base station eNB#2 (Partial handover).

Figure 5:
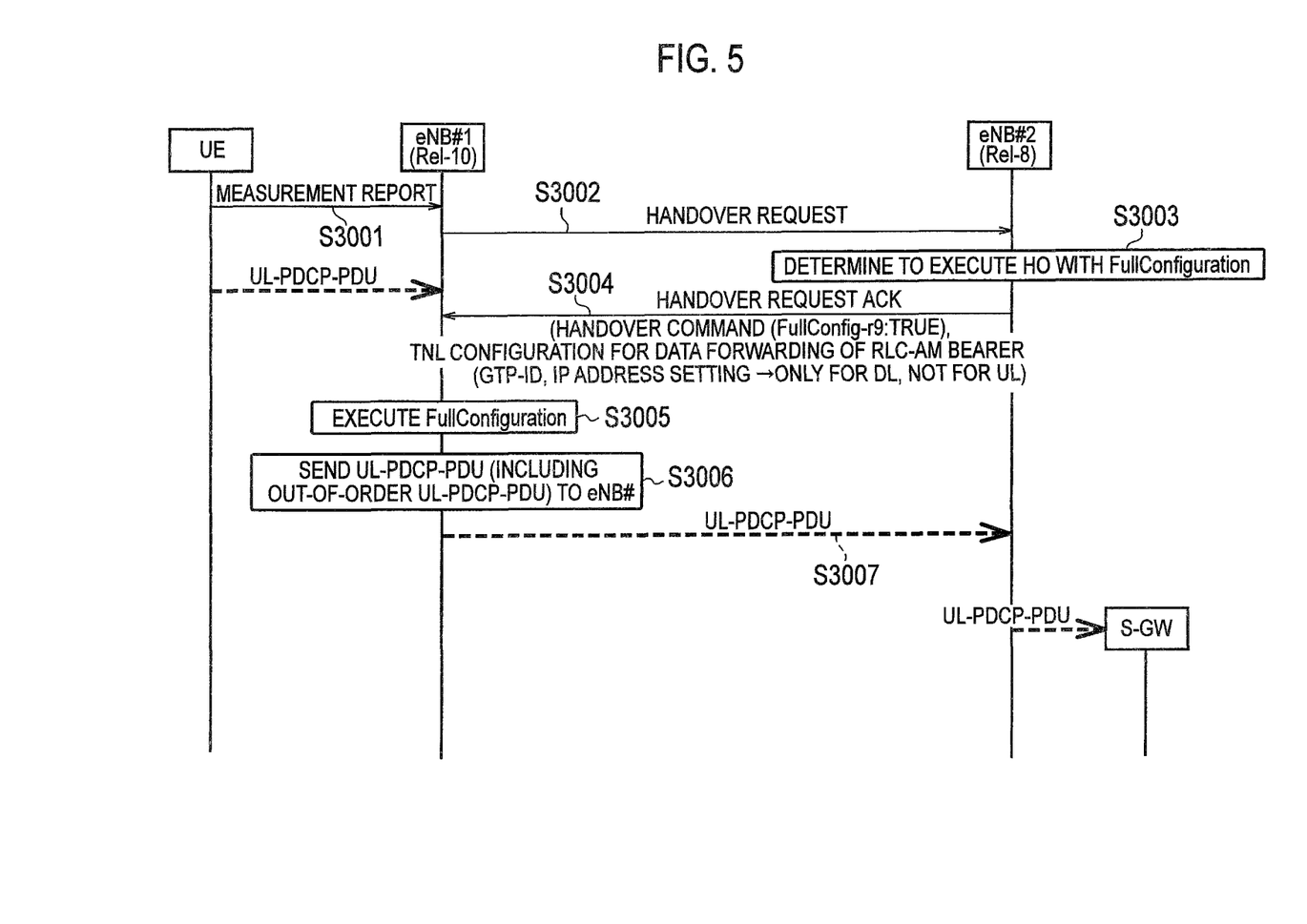
FIG. 5 is a sequence diagram presenting an example of an operation of a mobile communication system according to a modified example 1 of the present invention.

With reference to FIG. 5, description is provided below for an operation of the mobile communication system according to the modified example 2.

As presented in FIG. 5, the operation in steps S3001 to S3005 is the same as the operation in steps S1001 to S1005 presented in FIG. 3.

The radio base station eNB#1 determines to forward all the UL-PDCP-PDUs having been successfully received (including Out-of-order UL-PDCP-PDUs) to the radio base station eNB#2 in step S3006, and forwards the UL-PDCP-PDUs to the radio base station eNB#2 in step S3007.

In step S3008, the radio base station eNB#2 forwards the UL-PDCP-PDUs to a gateway node S-GW (S1 interface).

In the mobile communication system according to the modified example 2, if the TCP layer function on a server side can receive UL-PDCP-PDUs which have been received out of order of the sequence numbers (that is, Out-of-order UL-PDCP-PDUs), and can send "Selective-ACK" in the downlink, the TCP layer function in the mobile station UE can detect that the aforementioned UL-PDCP-PDUs have been discarded, and can resend the UL-PDCP-PDUs. This makes it possible to avoid a TCP slow start due to RTO (Retransmission Time Out), in other words, to avoid a decrease in the throughput in the uplink in Inter-eNB handover with "full configuration".

The features of the present embodiment may also be expressed as follows.

A first feature of the present embodiment is summarized as a mobile communication method of executing a handover of a mobile station UE from a cell under a radio base station eNB#1 (first radio base station) to a cell under a radio base station eNB#2 (second radio base station), the method including the steps of, in the handover, causing the radio base station eNB#1 to discard all the UL-PDCP-PDUs having been successfully received, if the radio base station eNB#2 instructs the mobile station UE to once delete all the configuration set between the mobile station UE and the radio base station eNB#1.

A second feature of the present embodiment is summarized as a mobile communication method of executing a handover of a mobile station UE from a cell under a radio base station eNB#1 to a cell under a radio base station eNB#2, the method including the steps of, in the handover, causing the radio base station eNB#1 to deliver all UL-PDCP-PDUs having been successfully received to a gateway node S-GW, if the radio base station eNB#2 instructs the mobile station UE to once delete all the configuration set between the mobile station UE and the radio base station eNB#1.

A third feature of the present embodiment is summarized as a mobile communication method of executing a handover of a mobile station UE from a cell under a radio base station eNB#1 to a cell under a radio base station eNB#2, the method including the steps of, in the handover, if the radio base station eNB#2 instructs the mobile station UE to once delete all the configuration set between the mobile station UE and the radio base station eNB#1, causing the radio base station eNB#1 to forward all UL-PDCP-PDUs having been successfully received to the radio base station eNB#2; and causing the radio base station eNB#2 to send the received UL-PDCP-PDUs to a gateway node S-GW.

A fourth feature of the present embodiment is summarized as a mobile communication method of executing a handover of a mobile station UE from a cell under a radio base station eNB#1 to a cell under a radio base station eNB#2, the method including the step of, in the handover, causing the radio base station eNB#1 to discard all UL-PDCP-PDUs having been successfully received if an identifier for a path for uplink data forwarding is not notified in "Handover Request Ack (handover request acknowledgement signal)" sent by the radio base station eNB#2.

A fifth feature of the present embodiment is summarized as a mobile communication method of executing a handover of a mobile station UE from a cell under a radio base station eNB#1 to a cell under a radio base station eNB#2, the method including the step of, in the handover, causing the radio base station eNB#1 to deliver all UL-PDCP-PDUs having been successfully received to a gateway node S-GW, if an identifier for a path for uplink data forwarding is not notified in "Handover Request Ack" sent by the radio base station eNB#2.

A sixth feature of the present embodiment is summarized as a mobile communication method of executing a handover of a mobile station UE from a cell under a radio base station eNB#1 to a cell under a radio base station eNB#2, the method including the step of, in the handover, if the radio base station eNB#2 does not admit to establish an RLC-AM bearer which is established between the radio base station eNB#1 and the mobile station UE, causing the radio base station eNB#1 to discard all UL-PDCP-PDUs having been successfully received via the RLC-AM bearer.

A seventh feature of the present embodiment is summarized as a mobile communication method of executing a handover of a mobile station UE from a cell under a radio base station eNB#1 to a cell under a radio base station eNB#2, the method including the step of, in the handover, if the radio base station eNB#2 does not admit to establish an RLC-AM bearer which is established between the radio base station eNB#1 and the mobile station UE, causing the radio base station eNB#1 to forward all UL-PDCP-PDUs having been successfully received via the RLC-AM bearer to the radio base station eNB#2.

An eighth feature of the present embodiment is summarized as a mobile communication method of executing a handover of a mobile station UE from a cell under a radio base station eNB#1 to a cell under a radio base station eNB#2, the method including the steps of, in the handover, if the radio base station eNB#2 does not admit to establish an RLC-AM bearer which is established between the radio base station eNB#1 and the mobile station UE, causing the radio base station eNB#1 to forward all UL-PDCP-PDUs having been successfully received via the RLC-AM bearer to the radio base station eNB#2; and causing the radio base station eNB#2 to send the received UL-PDCP-PDUs to a gateway node S-GW.

A ninth feature of the present embodiment is summarized as a radio base station eNB capable of operating as a radio base station eNB#1 in a handover of a mobile station UE from a cell under the radio base station eNB#1 to a cell under a radio base station eNB#2, the radio base station eNB including a handover control unit 13 configured to, in the handover, discard all UL-PDCP-PDUs having been successfully received, if the radio base station eNB#2 instructs the mobile station UE to once delete all the configuration set between the radio base station eNB and the mobile station UE.

A tenth feature of the present embodiment is summarized as a radio base station eNB capable of operating as a radio base station eNB#1 in a handover of a mobile station UE from a cell under the radio base station eNB#1 to a cell under a radio base station eNB#2, the radio base station eNB including a transmission unit 12 configured to, in the handover, deliver all UL-PDCP-PDUs having been successfully received to the radio base station eNB#2 or a gateway node S-GW, if the radio base station eNB#2 instructs the mobile station UE to once delete all the configuration set between the radio base station eNB and the mobile station UE.

An eleventh feature of the present embodiment is summarized as a radio base station eNB capable of operating as a radio base station eNB#1 in a handover of a mobile station UE from a cell under the radio base station eNB#1 to a cell under a radio base station eNB#2, the radio base station eNB including a handover control unit 13 configured to, in the handover, discard all UL-PDCP-PDUs having been successfully received if an identifier for a path for uplink data forwarding is not notified in "Handover Request Ack" sent by the radio base station eNB#2.

A twelfth feature of the present embodiment is summarized as a radio base station eNB capable of operating as a radio base station eNB#1 in a handover of a mobile station UE from a cell under the radio base station eNB#1 to a cell under a radio base station eNB#2, the radio base station eNB including a transmission unit 12 configured to, in the handover, deliver all UL-PDCP-PDUs having been successfully received to a gateway node S-GW, if an identifier for a path for uplink data forwarding is not notified in "Handover Request Ack" sent by the radio base station eNB#2.

A thirteen feather of the present embodiment is summarized as a radio base station eNB capable of operating as a radio base station eNB#1 in a handover of a mobile station UE from a cell under the radio base station eNB#1 to a cell under a radio base station eNB#2, the radio base station eNB including a handover control unit 13 configured to, in the handover, if the radio base station eNB#2 does not admit to establish an RLC-AM bearer which is established between the radio base station eNB and the mobile station UE, discard all UL-PDCP-PDUs having been successfully received via the RLC-AM bearer.

A fourteenth feature of the present embodiment is summarized as a radio base station eNB capable of operating as a radio base station eNB#1 in a handover of a mobile station LIE from a cell under the radio base station eNB#1 to a cell under a radio base station eNB#2, the radio base station eNB including a transmission unit 12 configured to, in the handover, if the radio base station eNB#2 does not admit to establish an RLC-AM bearer which is established between the radio base station eNB and the mobile station UE, deliver all UL-PDCP-PDUs having been successfully received via the RLC-AM bearer to the radio base station eNB#2 or a gateway node S-GW.

It should be noted that the foregoing operations of the mobile stations UE and the radio base stations eNB#1/eNB#2 may be implemented by hardware, may be implemented by a software module executed by a processor, or may be implemented in combination of the two.

The software module may be provided in a storage medium in any format, such as a RAM (Random Access Memory), a flash memory, a ROM (Read Only Memory), an EPROM (Erasable Programmable ROM), an EEPROM (Electronically Erasable and Programmable ROM), a register, a hard disk, a removable disk, or a CD-ROM.

The storage medium is connected to a processor so that the processor can read and write information from and to the storage medium. Instead, the storage medium may be integrated in a processor. The storage medium and the processor may be provided inside an ASIC. Such an ASIC may be provided in the mobile stations UE and the radio base stations eNB#1/eNB#2. Otherwise, the storage medium and the processor may be provided as discrete components inside the mobile stations UE and the radio base stations eNB#1/eNB#2.

Hereinabove, the present invention has been described in detail by use of the foregoing embodiments. However, it is apparent to those skilled in the art that the present invention should not be limited to the embodiments described in the specification. The present invention can be implemented as an altered or modified embodiment without departing from the spirit and scope of the present invention, which are determined by the description of the scope of claims. Therefore, the description of the specification is intended for illustrative explanation only and does not impose any limited interpretation on the present invention.

Note that the entire content of Japanese Patent Application No. 2013-180498 (filed on Aug. 30, 2013) is incorporated by reference in the present specification.

INDUSTRIAL APPLICABILITY

As described above, according to the present invention, it is possible to provide a mobile communication method and a radio base station capable of appropriately handling UL-PDCP-PDUs in Inter-eNB handover with "full configuration".

EXPLANATION OF THE REFERENCE NUMERALS

S-GW gateway node
eNB#1, eNB#2 radio base station
UE mobile station
11 reception unit
12 transmission unit
13 handover control unit

The invention claimed is:
1. A mobile communication method of executing a handover of a mobile station from a cell under a first radio base station to a cell under a second radio base station,
the method comprising the step of, in the handover, causing the first radio base station to discard all Uplink-Packet Data Convergence-Protocol Data Units (UL-PDCP-PDUs) having been successfully received, if an identifier for a path for uplink data forwarding is not notified in a handover request acknowledgement signal sent by the second radio base station.

2. A mobile communication method of executing a handover of a mobile station from a cell under a first radio base station to a cell under a second radio base station,
the method comprising the step of, in the handover, causing the first radio base station to deliver all Uplink-Packet Data Convergence-Protocol Data Units (UL-PDCP-PDUs) having been successfully received to a gateway node, if an identifier for a path for uplink data forwarding is not notified in a handover request acknowledgement signal sent by the second radio base station.

3. A mobile communication method of executing a handover of a mobile station from a cell under a first radio base station to a cell under a second radio base station,
the method comprising the step of, in the handover, if the second radio base station does not admit to establish an Radio Link Control-Acknowledged Mode (RLC-AM) bearer which is established between the first radio base station and the mobile station, causing the first radio base station to discard all Uplink-Packet Data Convergence-Protocol Data Units (UL-PDCP-PDUs) having been successfully received via the RLC-AM bearer.

4. A mobile communication method of executing a handover of a mobile station from a cell under a first radio base station to a cell under a second radio base station,
the method comprising the step of, in the handover, if the second radio base station does not admit to establish an Radio Link Control-Acknowledged Mode (RLC-AM) bearer which is established between the first radio base station and the mobile station, causing the first radio base station to deliver all Uplink-Packet Data Convergence-Protocol Data Units (UL-PDCP-PDUs) having been successfully received via the RLC-AM bearer to a gateway node.

5. A mobile communication method of executing a handover of a mobile station from a cell under a first radio base station to a cell under a second radio base station,
the method comprising the steps of, in the handover, if the second radio base station does not admit to establish an Radio Link Control-Acknowledged Mode (RLC-AM) bearer which is established between the first radio base station and the mobile station,
causing the first radio base station to forward all Uplink-Packet Data Convergence-Protocol Data Units (UL-PDCP-PDUs) having been successfully received via the RLC-AM bearer to the second radio base station; and
causing the second radio base station to deliver the received UL-PDCP-PDUs to a gateway node.

6. A radio base station capable of operating as a first radio base station in a handover of a mobile station from a cell under the first radio base station to a cell under a second radio base station,
the radio base station comprising a control unit configured to, in the handover, discard all Uplink-Packet Data Convergence-Protocol Data Units (UL-PDCP-PDUs) having been successfully received if an identifier for a path for uplink data forwarding is not notified in a handover request acknowledgement signal sent by the second radio base station.

7. A radio base station capable of operating as a first radio base station in a handover of a mobile station from a cell under the first radio base station to a cell under a second radio base station,
the radio base station comprising a transmission unit configured to, in the handover, deliver all Uplink-Packet Data Convergence-Protocol Data Units (UL-PDCP-PDUs) having been successfully received to a gateway node, if an identifier for a path for uplink data forwarding is not notified in a handover request acknowledgement signal sent by the second radio base station.

8. A radio base station capable of operating as a first radio base station in a handover of a mobile station from a cell under the first radio base station to a cell under a second radio base station,
the radio base station comprising a control unit configured to, in the handover, if the second radio base station does not admit to establish an Radio Link Control-Acknowledged Mode (RLC-AM) bearer which is established between the first radio base station and the mobile station, discard all Uplink-Packet Data Convergence-Protocol Data Units (UL-PDCP-PDUs) having been successfully received via the RLC-AM bearer.

9. A radio base station capable of operating as a first radio base station in a handover of a mobile station from a cell under the first radio base station to a cell under a second radio base station,
the radio base station comprising a transmission unit configured to, in the handover, if the second radio base station does not admit to establish an Radio Link Control-Acknowledged Mode (RLC-AM) bearer which is established between the first radio base station and the mobile station, deliver all Uplink-Packet Data Convergence-Protocol Data Units (UL-PDCP-PDUs) having been successfully received via the RLC-AM bearer to the second radio base station or a gateway node.

* * * * *